April 10, 1945. J. D. LE FRANK 2,373,124
DISPENSING DEVICE
Filed Sept. 4, 1941 2 Sheets-Sheet 1
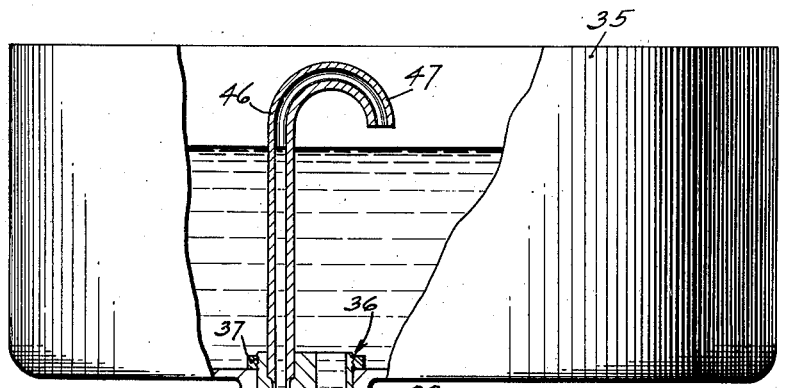
Fig.1
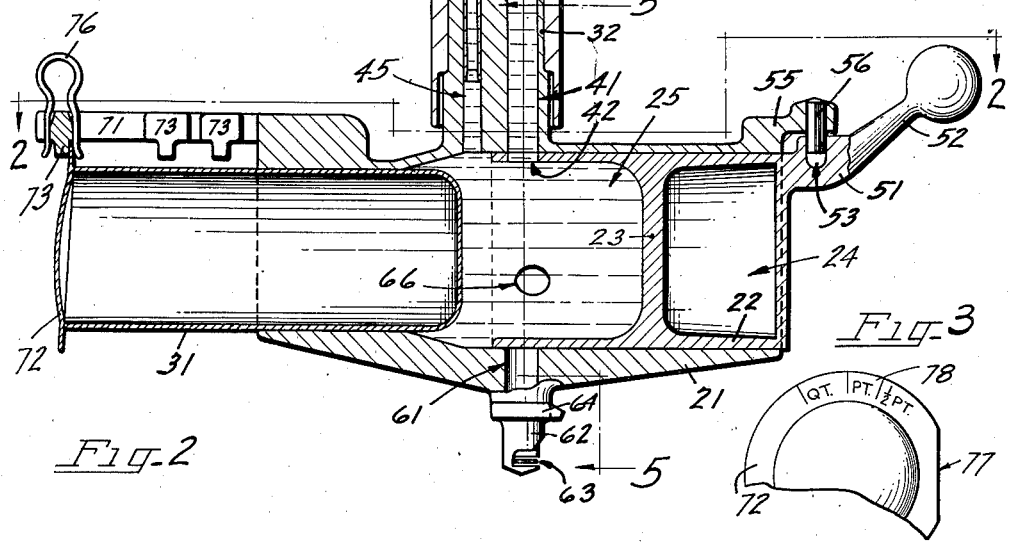
Fig.2
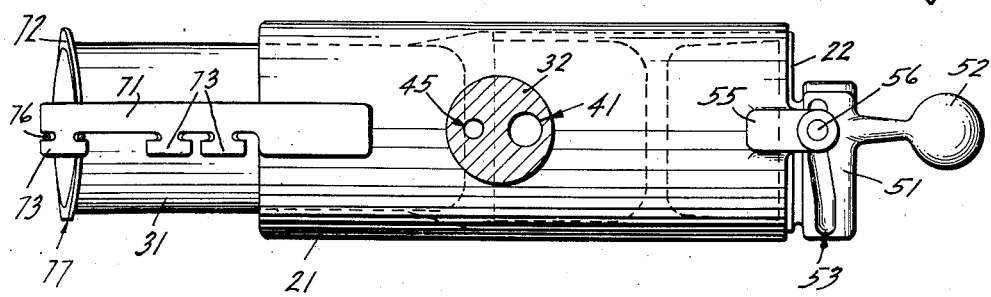
John D. Le Frank
INVENTOR.
BY Ivan D. Thornburgh
Charles H. Clyde
ATTORNEYS April 10, 1945. J. D. LE FRANK 2,373,124
DISPENSING DEVICE
Filed Sept. 4, 1941 2 Sheets-Sheet 2
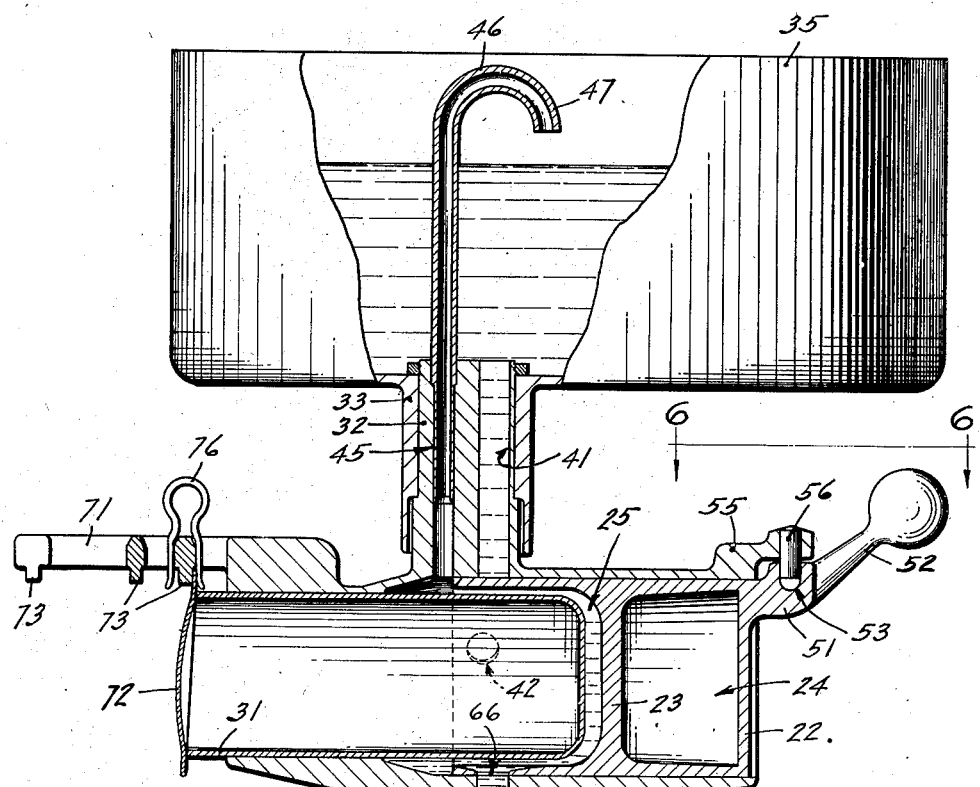
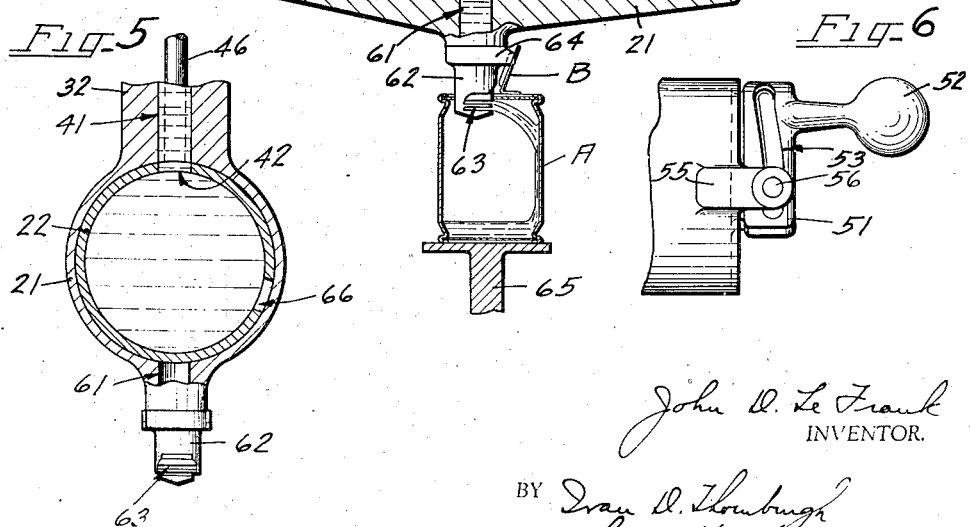
John D. Le Frank
INVENTOR.
BY Ivan D. Thornburgh
Charles H. Give ATTORNEYS Patented Apr. 10, 1945

2,373,124

UNITED STATES PATENT OFFICE 2,373,124

DISPENSING DEVICE

John D. Le Frank, Maplewood, N. J., assignor to American Can Company, New York, N. Y., a corporation of New Jersey Application September 4, 1941, Serial No. 409,577

7 Claims. (Cl. 222—442)

The present invention relates to a filling head for filling a measured quantity of liquid, such as milk, into a container and has particular reference to an improved mechanism in such a head for insuring a more accurate and better fill, provision also being made for quick and easy adjustment to adapt the device to the measuring of different quantities of the liquid.

An object of the invention is the provision of a filling head for liquids which is adapted for accurate measurement of the liquid in which the measuring chamber is changed in capacity to insure a more homogeneous fill.

Another object of the invention is the provision of an adjustable filling head for liquids which may be changed to adapt it for filling a desired quantity of the liquid.

Yet another object is the provision of a filling head including a displacement cylinder, the position of the cylinder relative to other parts of the machine determining the amount of liquid measured out for filling.

Still another object is the provision of a filling head for filling liquids, such as milk, which tend to foam so that the foam is not discharged into the container being filled.

A further object of the invention is to provide a filling head valve and displacement cylinder assembly of such character that the fixed cylindrical casing for movably containing such parts is open at its opposite ends, to permit insertion and removal of the valve and cylinder respectively at said opposite casing ends, thereby facilitating assembly of the parts, as well as their complete disassembly for cleaning purposes.

Numerous other objects and advantages of the invention will be apparent as it is better understood from the following description, which, taken in connection with the accompanying drawings, discloses a preferred embodiment thereof.

Referring to the drawings:

Figure 1 is a side elevation of a filling head embodying the present invention, parts being broken away to show the filling of the measuring chamber;

Fig. 2 is a plan sectional view as viewed substantially along the broken section line 2—2 in Fig. 1;

Fig. 3 is a fragmentary detail in elevation and showing the end of the displacement chamber as viewed from the left of Fig. 1;

Fig. 4 is a view similar to Fig. 1 but showing a different position of relatively movable parts of the filling head and also showing discharge of the liquid into a container;

Fig. 5 is a transverse sectional view taken substantially along the broken line 5—5 in Fig. 1; and Fig. 6 is a detail view of the right hand side of the machine (as viewed in Fig. 2) such as it would appear when taken along the line 6—6 in Fig. 4, and showing the parts in a different position.

As an embodiment of the present invention there is illustrated in the drawings a cylindrical casing 21 (Figs. 1 and 4) which partially encloses a measuring chamber. This chamber is open at both ends and a cylindrical valve 22 is disposed in one open end of the cylindrical casing (at the right as viewed in Figs. 1 and 4). This construction permits complete insertion and removal of the valve at its said open end of the casing 21 for convenient assembly and cleaning purposes. The valve 22 is formed with a central web or wall 23 which divides it into a dead chamber 24 and a filling chamber 25.

The filling chamber 25 constitutes in part the measuring chamber for the filling head. The web 23 of the valve provides one wall of the chamber and the opposite wall is formed by a displacement cylinder 31 which tightly fits into the opposite open end (at the left in Figs. 1 and 4) of the casing member 21. This displacement cylinder 31 tightly fits in the casing 21 but is adapted to be moved in and out for a different capacity of the measuring chamber, as well as complete removal of the displacement cylinder for cleaning purposes. This will be hereinafter more fully described.

The casing 21 is extended at the top into a stem 32 which is adapted to fit into a sleeve 33 formed on the bottom of a liquid supply or reservoir tank 35. The upper end of the stem 32 may be threaded as at 36 to accommodate a locknut 37 for holding the reservoir in liquid-tight position over the casing 21.

The stem 32 is provided with a vertical bore or port 41 the upper end of which leads into the interior of the supply tank 35. This bore at the bottom passes through the hollow cylindrical wall of the casing 21. In one position of the valve member 22 this bore 41 aligns with a port 42 cut through the wall of the valve. When so aligned, connection is made between the reservoir and the measuring chamber. This aligned position is illustrated in Fig. 1 of the drawings.

The stem 32 of the cylindrical casing is also cut through with a second bore or port 45 which opens at its top within the reservoir. The two bores 41, 45 are parallel and the vertical bore 45 provides a vent for the measuring chamber. A vent tube 46 is mounted in the tank and its lower end is fitted tightly within the bore 45. The upper end of the tube is curved as at 47, its extreme end terminating within the tank and above the liquid level.

This construction vents the measuring chamber and permits flowing of liquid from the reservoir tank 35 into the filling chamber 25 so that the measuring chamber may be filled completely with the liquid. This vent tube also allows air to enter the measuring chamber as the liquid is discharged into a container during the filling operation.

In the case of milk or other liquids having a tendency to foam, since the foam is always on the top of the liquid, the foam which forms within the measuring chamber will enter into the bore 45 and will pass up into the vent tube 46. Advantage is taken of this action to obtain a better fill for the container by eliminating the foam from the measuring chamber. This foam elimination by way of the vent opening 45 and the vent tube 46 utilizes a partial contracting of the measuring chamber after a measured quantity of the liquid has been withdrawn from the reservoir and just before discharging the measured liquid into a container.

The valve 22 may be operated in any suitable manner after the liquid has filled the measuring chamber to move the port 42 of the valve out of register with the bottom end of the bore 41. A partial rotation of the valve shuts off communication between the reservoir and the measuring chamber. In the drawings a simple hand actuation of the valve is illustrated.

The outer end of the valve is formed with a semicircular lug 51 (Figs. 1 and 2) from which there is extended a handle 52. This handle permits rotation of the valve when it is desirable to discharge the measured liquid from the measuring chamber.

The lug 51 on its upper surface is formed with a cam groove 53 which for a part of its extent is inclined or offset as best shown in Figs. 2 and 6. The casing 21 is provided with a lug 55 which supports a depending pin 56. The pin 56 extends into the groove 53. As the valve 22 is rotated, the groove 53 of the lug 51 moves over the end of the stationary pin 56 and owing to the inclined character of the groove, this causes the valve to move inwardly a slight distance (toward the left in Fig. 1).

This inward movement of the valve changes the capacity of the measuring chamber by making it smaller. During such lessening of the chamber volume, liquid or foam which may be in the vent tube 46 and in the vent passageway 45 is forced up and a portion of the same is discharged into the reservoir. This provides for a more homogeneous fill of the measured liquid when it discharges into the container or other place of deposit. In the case of milk or liquids which are liable to foam during the filling of the measuring chamber such foam is discharged back into the reservoir so that the liquid left in the measuring chamber, plus the liquid in the vent tube, does not contain any foam.

At the bottom of the cylindrical casing 21 a discharge opening 61 is formed. This opening passes into a discharge nozzle 62 which may be secured to the bottom of the cylinder. Such a nozzle is provided with a discharge outlet 63 which preferably is cut in from one side so as to further reduce any foaming tendency of the liquid during the discharge of the same into a container.

When the measured charge of liquid is ready for discharge into a container (designated by the letter A, Fig. 4) the container is lifted so that its open filling opening passes over the nozzle 62. Container A preferably is of the type commonly used for milk and has a hinge plug closure B. The nozzle 62 is formed with a shoulder 64 which holds the plug closure B in open position during the filling operation.

For this purpose of lifting the container, a support plate or lifter pad 65 may be provided as shown in Fig. 4. A container A placed on the pad is brought into the position shown in Fig. 4 for discharge of the milk or other liquid therein.

The valve 22 adjacent the bottom also is formed with a laterally extending port 66 (Figs. 1 and 4). After the container A has been brought into filling position and at the end of the rotation of the valve 22, this port 66 is aligned with the discharge passage 61 leading through the nozzle 62. The measured charge of liquid thereupon flows by gravity into the container. At this time air enters the vent tube 46 and allows for a steady flow of the liquid from the measuring chamber.

After the displacement cylinder 31 has been positioned for determining the desired capacity of the measuring chamber, no further movement of the cylinder takes place as long as filling continues for that particular measurement. In the event that a different size container is to be filled, the discharge cylinder is then slid longitudinally within the casing 21 until it is brought into position to establish the proper capacity for the measuring chamber.

The drawings by way of example illustrate a filling head adapted for filling three distinct quantities of liquid such as the quart, the pint and the half pint sizes. These are common sizes used in the filling of milk into fibre containers such as is suggested by a container A. Obviously other sizes and a different number could be used within the limits of the innermost and the outermost positions of the displacement cylinder within its casing.

The casing 21 at its upper end is formed with a projecting bar 71 (Figs. 1, 2 and 4) which extends toward the rear of the casing, i. e., on the side of the displacement cylinder. The displacement cylinder at its outer end is formed with an annular flange 72 which is adapted to be brought against one of three stop lugs 73 formed along one side of the bar 71.

In the example shown the outermost lug 73 denotes the proper position for the displacement cylinder flange when the measuring chamber is set for the quart fill. This is shown in Fig. 1. At this time the flange 72 is against the lower inner edge of the outer lug. In Fig. 4 the displacement cylinder 31 is shown in its innermost or half pint measure position. Its flange is against the innermost lug. For the pint size, the displacement cylinder would be positioned with its flange against the middle or intermediate stop lug 73, as will be obvious.

Provision is then made for holding the parts in each set or adjusted position. A spring clip 76 is adapted to be pushed down over the engaged lug 73 and over the flange 72 of the displacement cylinder 31 as it rests in its adjusted position against the stop lug.

The flange 72 is cut away along one side as at 77 (Fig. 3) so that when the displacement cylinder is rotated to bring this cut-away part at the top, the flange 72 will pass under and clear the lugs 73. This permits pushing in or drawing out of the displacement cylinder until it is in the desired position. When so positioned the cylinder is rotated until the unbroken part of the flange 72 engages against the stop lug.

While the particular stop lug engaged by the flange will give visual indication of the selected fill by reason of its position, additional provision may be made for having this position shown by legend or in other suitable manner. For this purpose, the flange 72 of the displacement cylinder may be stamped with a suitable legend 78 (Fig. 3) to designate the quart, pint or the half pint chamber capacities. In utilizing this manner of indicating the position, the correct mark is brought against the stop lug 73, so that the setting of the displacement cylinder and the capacity of the measuring chamber may be readily determined by referring to this mark.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a filling machine for milk and similar liquids having a tendency to foam, the combination of a reservoir for holding a supply of milk, a casing enclosing a measuring chamber for receiving milk from said reservoir, a rotary valve in said casing for opening communication between said measuring chamber and said reservoir to withdraw a predetermined quantity of milk from the reservoir supply and for discharging the measured quantity from said chamber, a vent tube extending at its lower end from said measuring chamber and terminating at its upper end above said reservoir for venting the said chamber, and a cam and follower connection between said rotary valve and said casing whereby said valve is urged longitudinally inwardly of said cylinder when said valve is rotated to discharge the measured milk from said chamber thereby to displace the foam which was created when the milk entered the chamber and force it up into said vent tube and reservoir and removing it from the measuring chamber so that it will not be discharged with the milk passing therefrom.

2. In a filling machine for liquids, the combination of a reservoir for holding the liquid, a cylindrical casing open at both ends and enclosing a measuring chamber for receiving liquid from said reservoir, a valve disposed in and closing off one open end of said casing, said valve being movable to establish communication with said reservoir to withdraw a predetermined measured quantity of liquid therefrom into said chamber and to discharge the measured quantity of liquid therefrom, and a displacement cylinder disposed in the opposite open end of said casing and extending into said measuring chamber, opposing walls of said cylinder and valve together with the walls of said casing defining said measuring chamber, said displacement cylinder being movable longitudinally of said casing to vary the measuring capacity of the chamber, the opposite open ends of said casing being of such character that the valve and cylinder may be withdrawn therefrom from their respective ends.

3. In a filling machine for liquids, the combination of a reservoir for holding the liquid, a cylindrical casing open at both ends and enclosing a measuring chamber for receiving liquid from said reservoir, a rotatable valve disposed in and closing off one open end of said casing, said valve being movable to establish communication with said reservoir to withdraw a predetermined measured quantity of liquid therefrom into said chamber and to discharge the measured quantity therefrom, said valve being movable longitudinally of said measuring chamber to impart pressure against the liquid received therein to expel excess liquid so as to accurately measure the liquid received from said reservoir, a displacement cylinder located in the opposite open end of said casing and extending at its inner end into said measuring chamber and extending at its outer end exteriorly of said casing, the opposing walls of said cylinder and valve forming with said casing a measuring chamber therebetween, said displacement cylinder being manually movable longitudinally of said casing and chamber to vary the capacity of the latter, and a locking device on said casing and including longitudinally spaced stop members engageable with a portion of the displacement cylinder exteriorly of said casing for holding the cylinder in a plurality of longitudinal positions relative to said casing, the opposite open ends of said casing being of such character that the valve and cylinder may be withdrawn therefrom from their respective ends.

4. In a filling machine for liquids having a tendency to foam, the combination of a reservoir for holding a supply of liquid, a cylindrical casing enclosing a measuring chamber communicably connected with said reservoir for receiving liquid from said reservoir, a movable valve journaled in an end of said casing and defining at its inner end one end of said measuring chamber, movement of said valve opening communication between said measuring chamber and said reservoir to withdraw into the chamber a predetermined quantity of liquid from the reservoir and for discharging the measured quantity of liquid from said chamber a vent port communicably connecting said chamber and reservoir, and means for shifting said valve longitudinally of and within said measuring chamber to compress the liquid in the chamber so as to expel the foam on the liquid received therein through said vent port back to the reservoir so as to accurately measure the received charge of liquid prior to discharging the same from said measuring chamber.

5. In a filling machine for milk and liquids having a tendency to foam, the combination of a reservoir for holding a supply of milk, a cylindrical casing open at both ends and enclosing a variable measuring chamber for receiving milk from said reservoir, a rotatable valve disposed in and closing off one end of said casing, said valve defining an end of said measuring chamber and rotatable in one direction to establish communication between said chamber and said reservoir to withdraw a predetermined quantity of milk from the reservoir supply and rotatable in the opposite direction for discharging the measured quantity of milk from said chamber, said valve being movable longitudinally of said measuring chamber for imparting pressure against the confined milk received therein to expel foam from the chamber and to accurately measure the received milk, a displacement cylinder disposed in and closing off the opposite end of said casing and extending into said measuring chamber to constitute a wall for the opposite end of said chamber, said displacement cylinder being movable longitudinally of said casing to increase or decrease the measuring capacity of said chamber, and a vent tube extending from said measuring chamber and communicating with said reservoir for venting the chamber during its filling with milk and for returning the foam separated from the measured charge of milk by the longitudinal movement of said valve so that the foam will not be discharged with the milk from the measuring chamber when said valve is moved into its discharge position, the opposite open ends of said casing being of such character that the valve and cylinder may be withdrawn therefrom from their respective ends.

6. In a filling machine for liquids, the combination of a reservoir for holding a supply of liquid, a cylindrical casing enclosing a measuring chamber for receiving measured quantities of liquid from said reservoir, a cylindrical hollow valve located in one end of said casing, said valve being rotatable in one direction to establish communication with said reservoir to withdraw a predetermined measured quantity of liquid from the reservoir into said chamber and rotatable in the opposite direction for discharging the measured quantity of liquid therefrom, said valve also constituting a wall for an end of said chamber, a displacement cylinder movable into the interior of said valve and spaced radially therefrom to constitute a partially annular configuration to said measuring chamber, the inner end of said displacement cylinder constituting a wall for the opposite end of said chamber and when disposed within said valve also constituting a side wall for the partially annular chamber, and means for holding said displacement cylinder in a selected position within said casing relative to said valve, whereby to provide a measuring chamber of variable desired capacity to accurately determine the volume of liquid received in and discharged from said measuring chamber, the opposite open ends of said casing being of such character that the valve and cylinder may be withdrawn therefrom from their respective ends.

7. In a filling machine for liquids having a tendency to foam, the combination of a reservoir for holding a supply of liquid, a cylindrical casing enclosing a measuring chamber for receiving liquid from said reservoir, a cylindrical valve located in one end of said casing and rotatable to establish communication with said reservoir to withdraw liquid from the latter into said chamber and also rotatable for discharging a measured quantity of liquid therefrom, said valve constituting an end wall for said chamber, a displacement cylinder located in the opposite end of said casing and constituting a longitudinally movable end wall for said measuring chamber, said cylinder having longitudinal movement within said casing relative to said rotatable valve to provide a measuring chamber of varying capacity, a vent tube communicating with said measuring chamber for venting the same and for removing foam therefrom, and means for moving said valve longitudinally of said casing to compress the liquid within said chamber so as to force foam from said chamber and for confining the desired measured quantity of liquid therein as an incident to discharging the same from said chamber, the opposite open ends of said casing being of such character that the valve and cylinder may be withdrawn therefrom from their respective ends.

JOHN D. LE FRANK.